US012665723B2

(12) United States Patent
Ma et al.

(10) Patent No.: US 12,665,723 B2
(45) Date of Patent: Jun. 23, 2026

(54) SOUNDING REFERENCE SIGNAL MULTIPLEXING FOR NON-TERRESTRIAL NETWORKS

(71) Applicant: QUALCOMM Incorporated, San Diego, CA (US)

(72) Inventors: Liangping Ma, San Diego, CA (US); Alberto Rico Alvarino, San Diego, CA (US); Xiao Feng Wang, San Diego, CA (US); Peter Gaal, San Diego, CA (US); Changhwan Park, San Diego, CA (US); Ayan Sengupta, San Diego, CA (US); Wanshi Chen, San Diego, CA (US); Jun Ma, San Diego, CA (US); Bharat Shrestha, San Diego, CA (US); Huilin Xu, Temecula, CA (US); Umesh Phuyal, San Diego, CA (US); Juan Montojo, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 18/573,886

(22) PCT Filed: Aug. 5, 2021

(86) PCT No.: PCT/CN2021/110903
§ 371 (c)(1),
(2) Date: Dec. 22, 2023

(87) PCT Pub. No.: WO2023/010416
PCT Pub. Date: Feb. 9, 2023

(65) Prior Publication Data
US 2024/0297761 A1 Sep. 5, 2024

(51) Int. Cl.
*H04L 5/00* (2006.01)
*H04W 72/1268* (2023.01)
*H04W 84/06* (2009.01)

(52) U.S. Cl.
CPC ....... *H04L 5/0051* (2013.01); *H04W 72/1268* (2013.01); *H04W 84/06* (2013.01)

(58) Field of Classification Search
None
See application file for complete search history.

(56) References Cited

U.S. PATENT DOCUMENTS

2020/0228190 A1* 7/2020 Cirik ..................... H04L 5/0048
2021/0029650 A1* 1/2021 Cirik ................... H04W 52/146
(Continued)

FOREIGN PATENT DOCUMENTS

CN 103220101 A 7/2013
CN 111835488 A 10/2020
(Continued)

OTHER PUBLICATIONS

Supplementary European Search Report—EP21952309—Search Authority—The Hague—Mar. 28, 2025.
(Continued)

*Primary Examiner* — Faiyazkhan Ghafoerkhan
(74) *Attorney, Agent, or Firm* — Dinsmore & Shohl LLP

(57) ABSTRACT

Certain aspects of the present disclosure provide a method for wireless communications by a UE that generally includes transmitting a first sounding reference signal (SRS), from a first antenna port in a first symbol, on one or more tones determined by a first comb size and a first tone offset, transmitting a second SRS, from a second antenna port in the first symbol, on one or more tones determined by the first comb size and a second tone offset different than the first tone offset, transmitting a third SRS, from the first antenna
(Continued)

Transmit a first SRS, from a first antenna port in a first symbol, on one or more tones determined by a first comb size and a first tone offset ⟍1105

Transmit a second SRS, from a second antenna port in the first symbol, on one or more tones determined by the first comb size and a second tone offset different than the first tone offset ⟍1110

Transmit a third SRS, from the first antenna port in a second symbol, on one or more tones determined by the first comb size and the second tone offset ⟍1115

Transmit a fourth SRS, from the second antenna port in the second symbol, on one or more tones determined by the first comb size and the first tone offset ⟍1120

⟍1100 port in a second symbol, on one or more tones determined by the first comb size and the second tone offset, and transmitting a fourth SRS, from the second antenna port in the second symbol, on one or more tones determined by the first comb size and the first tone offset.

27 Claims, 14 Drawing Sheets

(56)                    References Cited

U.S. PATENT DOCUMENTS

| | | | | |
|---|---|---|---|---|
| 2021/0092687 A1* | 3/2021 | Harrison | ............ | H04L 25/0226 |
| 2022/0124631 A1* | 4/2022 | Harrison | ............ | H04W 52/146 |
| 2022/0210844 A1* | 6/2022 | MolavianJazi | ....... | H04L 5/0053 |
| 2023/0155765 A1* | 5/2023 | Zhang | ................... | H04L 5/0048 |
| | | | | 370/329 |
| 2024/0297761 A1* | 9/2024 | Ma | ................... | H04W 72/1268 |

FOREIGN PATENT DOCUMENTS

| | | | |
|---|---|---|---|
| WO | 2021012981 A1 | 1/2021 |
| WO | 2021034250 A1 | 2/2021 |

OTHER PUBLICATIONS

International Search Report and Written Opinion—PCT/CN2021/110903—ISA/EPO—Apr. 26, 2022.
Vivo: "Further Discussion on SRS Enhancement", 3GPP TSG RAN WG1 #104-e, R1-2100426, e-Meeting, Jan. 25-Feb. 5, 2021, 22 Pages, Feb. 5, 2021, The whole document.

* cited by examiner

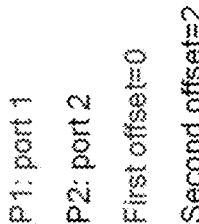
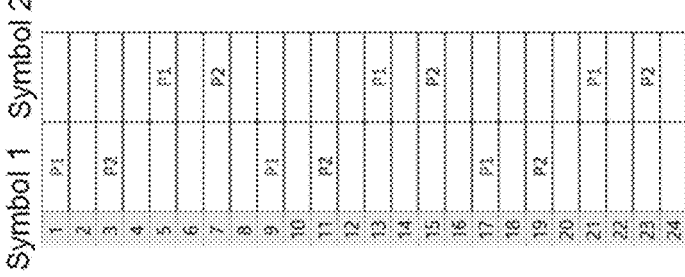
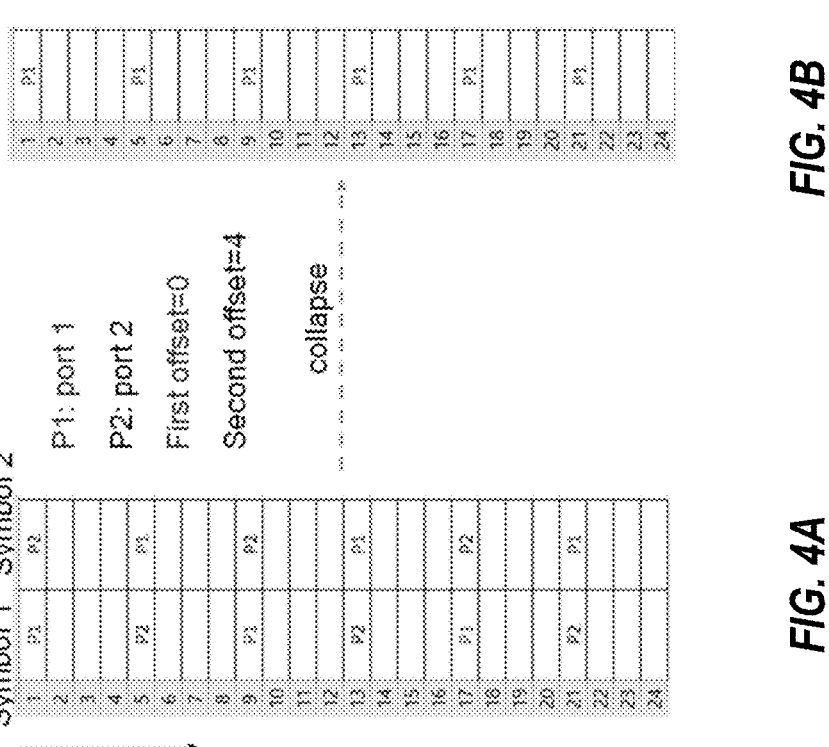
*FIG. 4A*
*FIG. 4B*
*FIG. 4C*

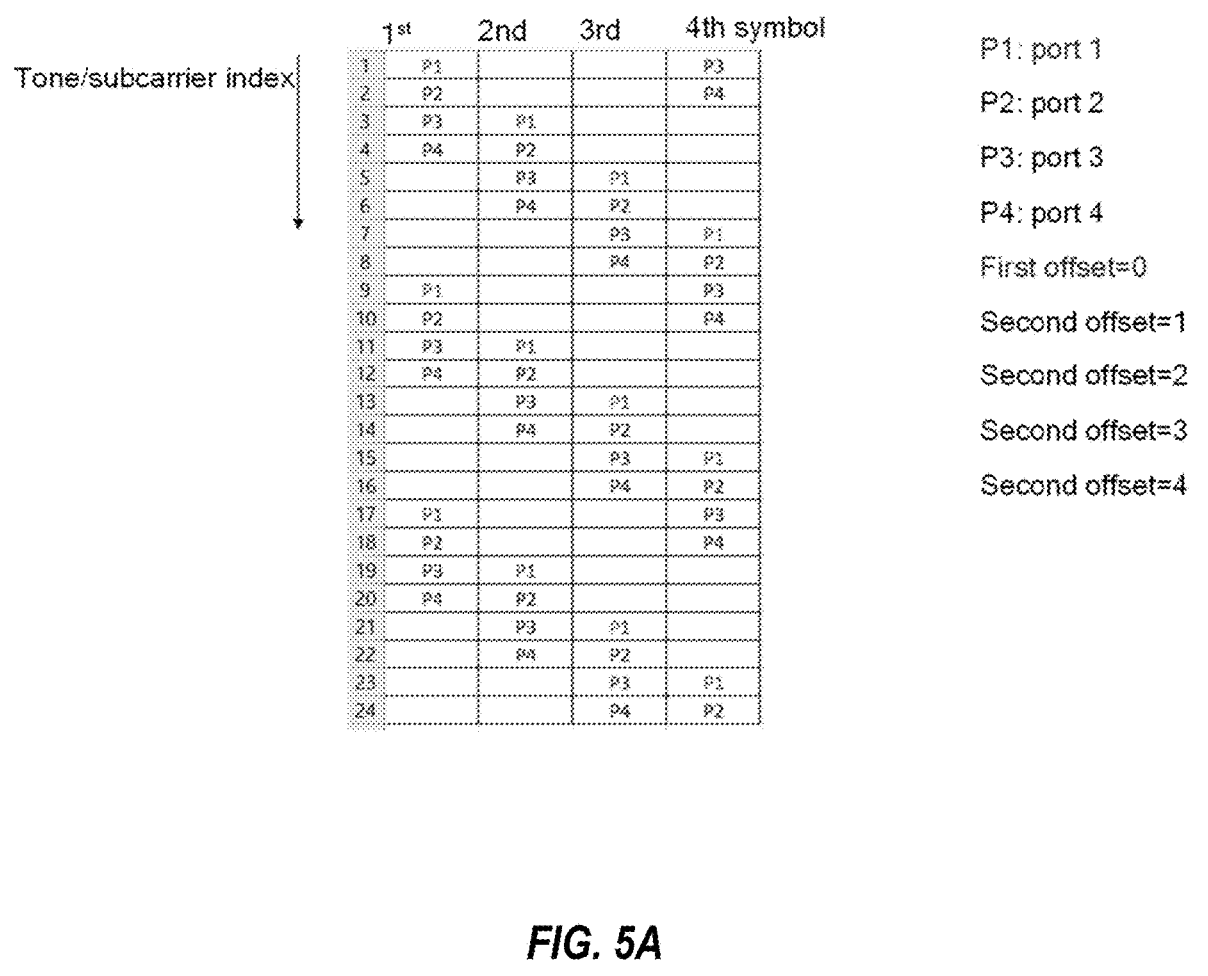

| Tone/subcarrier index | 1st | 2nd | 3rd | 4th symbol |
|---|---|---|---|---|
| 1 | P1 | | | P3 |
| 2 | P2 | | | P4 |
| 3 | P3 | P1 | | |
| 4 | P4 | P2 | | |
| 5 | | P3 | P1 | |
| 6 | | P4 | P2 | |
| 7 | | | P3 | P1 |
| 8 | | | P4 | P2 |
| 9 | P1 | | | P3 |
| 10 | P2 | | | P4 |
| 11 | P3 | P1 | | |
| 12 | P4 | P2 | | |
| 13 | | P3 | P1 | |
| 14 | | P4 | P2 | |
| 15 | | | P3 | P1 |
| 16 | | | P4 | P2 |
| 17 | P1 | | | P3 |
| 18 | P2 | | | P4 |
| 19 | P3 | P1 | | |
| 20 | P4 | P2 | | |
| 21 | | P3 | P1 | |
| 22 | | P4 | P2 | |
| 23 | | | P3 | P1 |
| 24 | | | P4 | P2 |

P1: port 1

P2: port 2

P3: port 3

P4: port 4

First offset=0

Second offset=1

Second offset=2

Second offset=3

Second offset=4

FIG. 5A

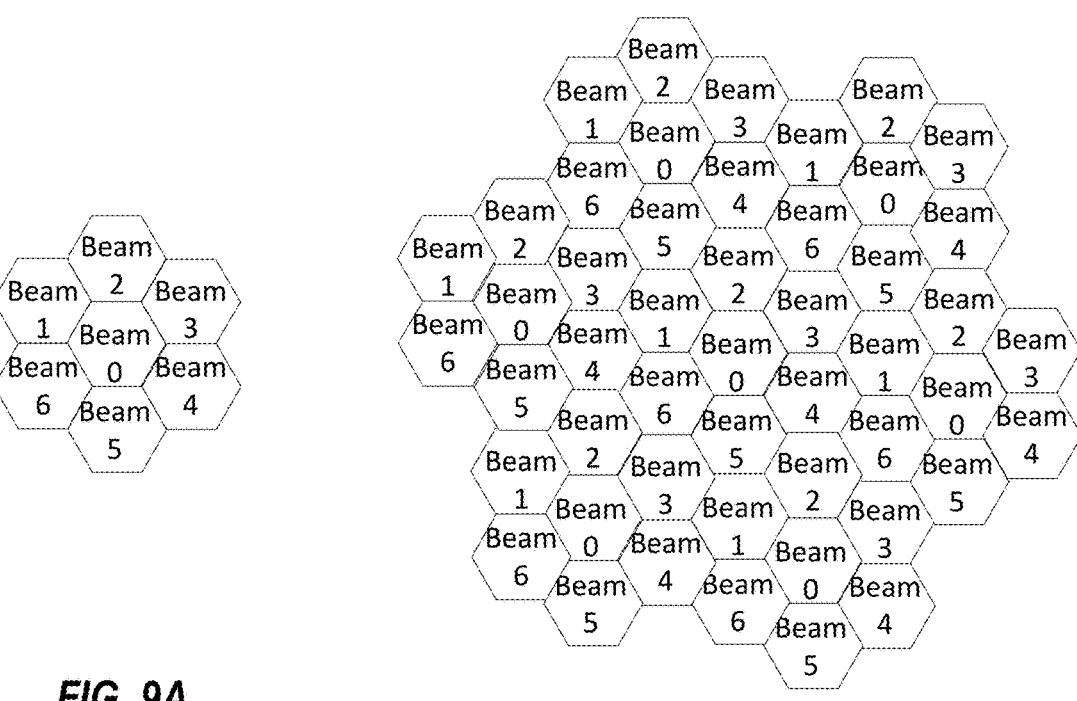
FIG. 9A
FIG. 9B
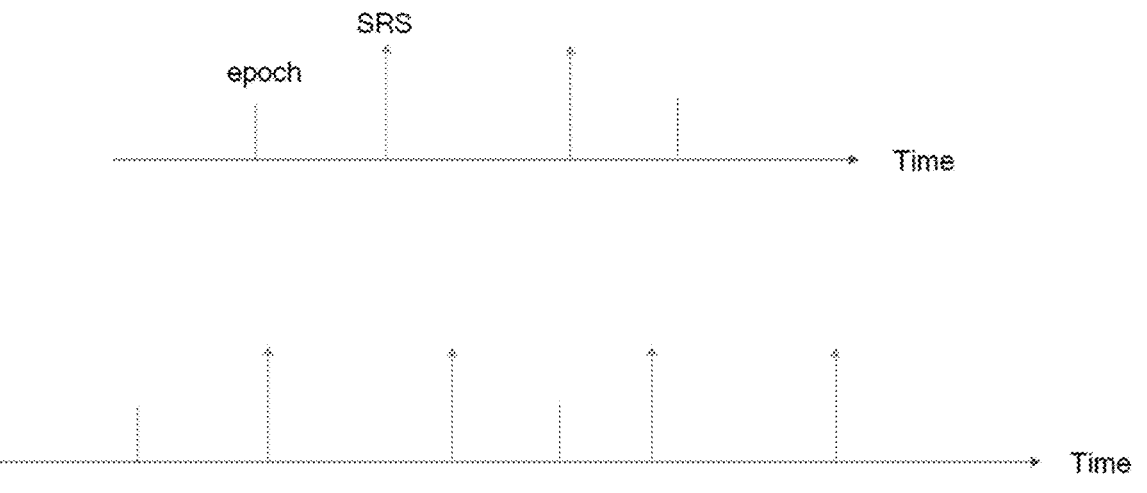
FIG. 10

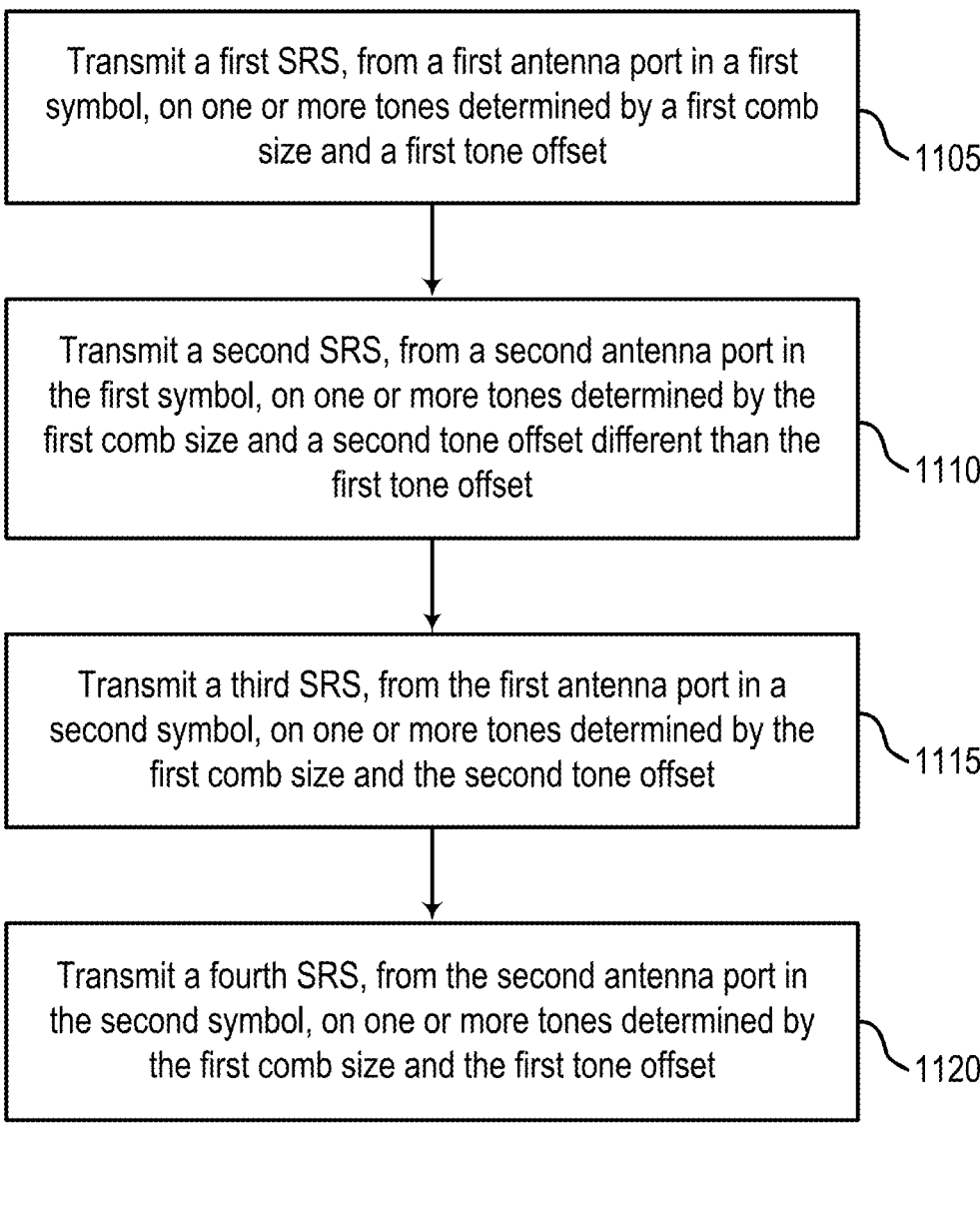

Transmit a first SRS, from a first antenna port in a first symbol, on one or more tones determined by a first comb size and a first tone offset ⟍1105

Transmit a second SRS, from a second antenna port in the first symbol, on one or more tones determined by the first comb size and a second tone offset different than the first tone offset ⟍1110

Transmit a third SRS, from the first antenna port in a second symbol, on one or more tones determined by the first comb size and the second tone offset ⟍1115

Transmit a fourth SRS, from the second antenna port in the second symbol, on one or more tones determined by the first comb size and the first tone offset ⟍1120

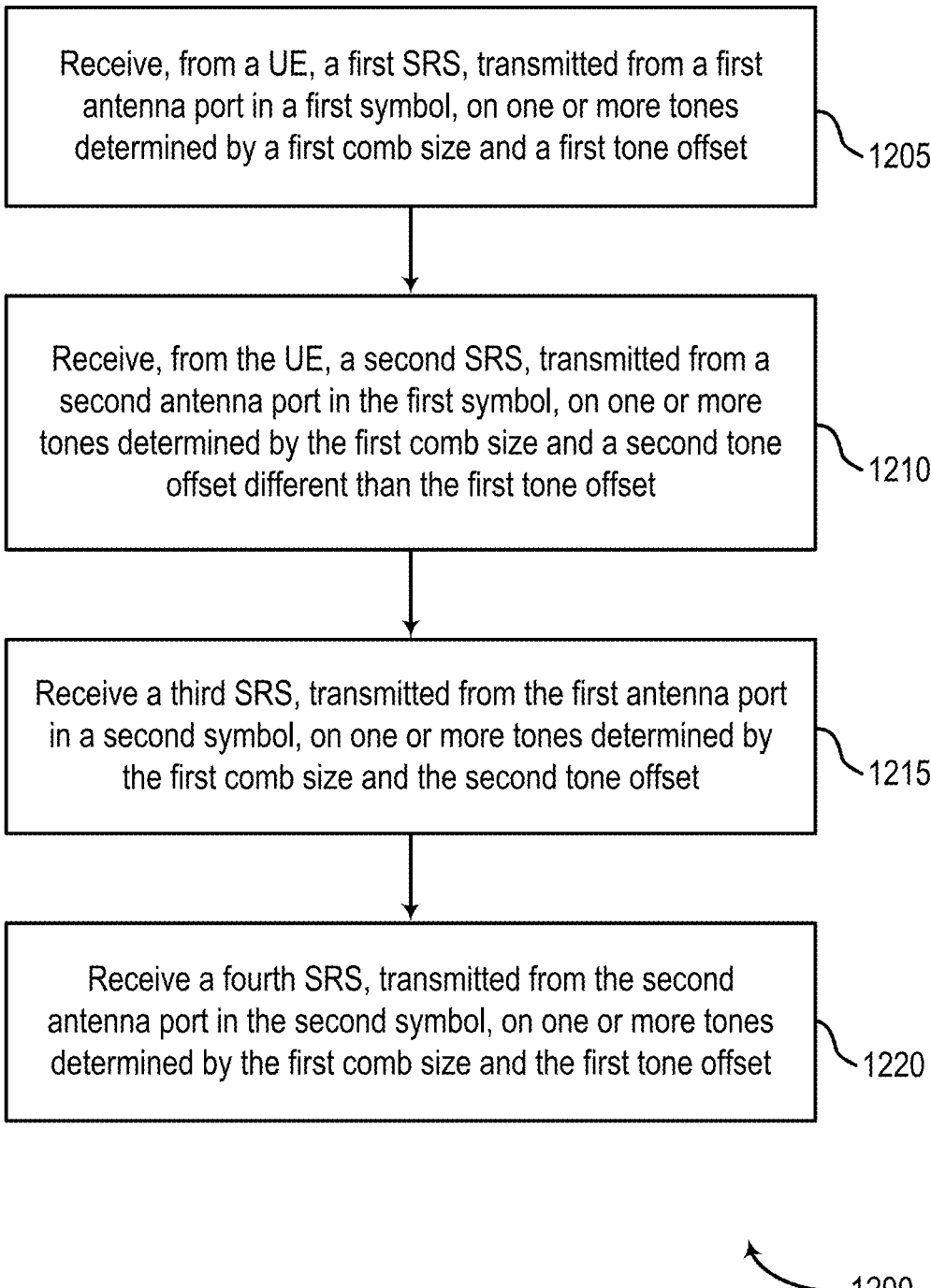

Receive, from a UE, a first SRS, transmitted from a first antenna port in a first symbol, on one or more tones determined by a first comb size and a first tone offset    1205

Receive, from the UE, a second SRS, transmitted from a second antenna port in the first symbol, on one or more tones determined by the first comb size and a second tone offset different than the first tone offset    1210

Receive a third SRS, transmitted from the first antenna port in a second symbol, on one or more tones determined by the first comb size and the second tone offset    1215

Receive a fourth SRS, transmitted from the second antenna port in the second symbol, on one or more tones determined by the first comb size and the first tone offset    1220

SOUNDING REFERENCE SIGNAL MULTIPLEXING FOR NON-TERRESTRIAL NETWORKS

CROSS-REFERENCE TO RELATED APPLICATIONS

This application is a national stage application under 35 U.S.C. 371 of PCT/CN2021/110903 filed Aug. 5, 2021, which is hereby expressly incorporated by reference herein in its entirety as if fully set forth below and for all applicable purposes.

INTRODUCTION

Aspects of the present disclosure relate to wireless communications, and more particularly, to techniques for multiplexing sounding reference signals (SRS).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communication by a user equipment (UE) includes transmitting a first sounding reference signal (SRS), from a first antenna port in a first symbol, on one or more tones determined by a first comb size and a first tone offset; transmitting a second SRS, from a second antenna port in the first symbol, on one or more tones determined by the first comb size and a second tone offset different than the first tone offset; transmitting a third SRS, from the first antenna port in a second symbol, on one or more tones determined by the first comb size and the second tone offset; and transmitting a fourth SRS, from the second antenna port in the second symbol, on one or more tones determined by the first comb size and the first tone offset.

In one aspect, a method for wireless communication by a network entity includes receiving, from a UE, a first SRS, transmitted from a first antenna port in a first symbol, on one or more tones determined by a first comb size and a first tone offset; receiving, from the UE, a second SRS, transmitted from a second antenna port in the first symbol, on one or more tones determined by the first comb size and a second tone offset different than the first tone offset; receiving a third SRS, transmitted from the first antenna port in a second symbol, on one or more tones determined by the first comb size and the second tone offset; and receiving a fourth SRS, transmitted from the second antenna port in the second symbol, on one or more tones determined by the first comb size and the first tone offset.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 4A-4C depict examples of sounding reference signal (SRS) multiplexing, according to aspects of the present disclosure.

FIGS. 5A and 5B depicts another example of SRS multiplexing, according to aspects of the present disclosure.

FIGS. 9A and 9B show example beam structures for a non-terrestrial network (NTN), according to aspects of the present disclosure.

FIG. 10 depicts an example of pre-compensation epochs for SRS, according to aspects of the present disclosure.

FIG. 11 shows example operations for wireless communications by a user equipment (UE), according to aspects of the present disclosure.

FIG. 12 shows example operations for wireless communications by a network entity, according to aspects of the present disclosure.

DETAILED DESCRIPTION

Aspects of the present disclosure provide apparatuses, methods, processing systems, and computer-readable mediums for multiplexing sounding reference signals (SRS) from multiple antenna ports. As will be described in greater detail below, techniques presented herein utilize different SRS comb structures across different symbols (referred to herein as SRS comb hopping) for an antenna port.

As used herein, the term antenna port generally refers to signal transmission under identical channel conditions. In other words, symbols that are transmitted via identical antenna ports are subject to the same channel conditions. In order to determine the characteristic channel for an antenna port, a receiver performs separate channel estimation for each antenna port. Separate reference signals (pilot signals) that are suitable for estimating the respective channel are used for each antenna port. SRS is one example of such reference signals.

In conventional systems, SRS from two ports of the same UE are multiplexed in the same OFDM symbol, but with different cyclic shifts. One potential problem with this approach is that the duration of the channel impulse response (CIR) seen by the receiver may become longer than the actual CIR duration due to a fractional sampling time offset at the receiver. This may be especially problematic for a small bandwidth SRS if the CIR from the two ports exceed a limit (e.g., half of the Fast Fourier Transform-FFT-window size), it will take additional procedures and complexity for the base station to separate them compared to the case of a short CIR.

Aspects of the present disclosure propose hopping SRS comb structures across symbols. Utilizing separate SRS combs for each antenna port, and hopping to a different SRS comb for each antenna port across symbols may result in a robustness to phase discontinuity. In some cases, separate power amplifiers (PAs) can be used for each port, which may help potential issues where SRS transmission are power limited in certain deployments, such as non-terrestrial networks (NTNs).

Introduction to Wireless Communication Networks

Figure 1:
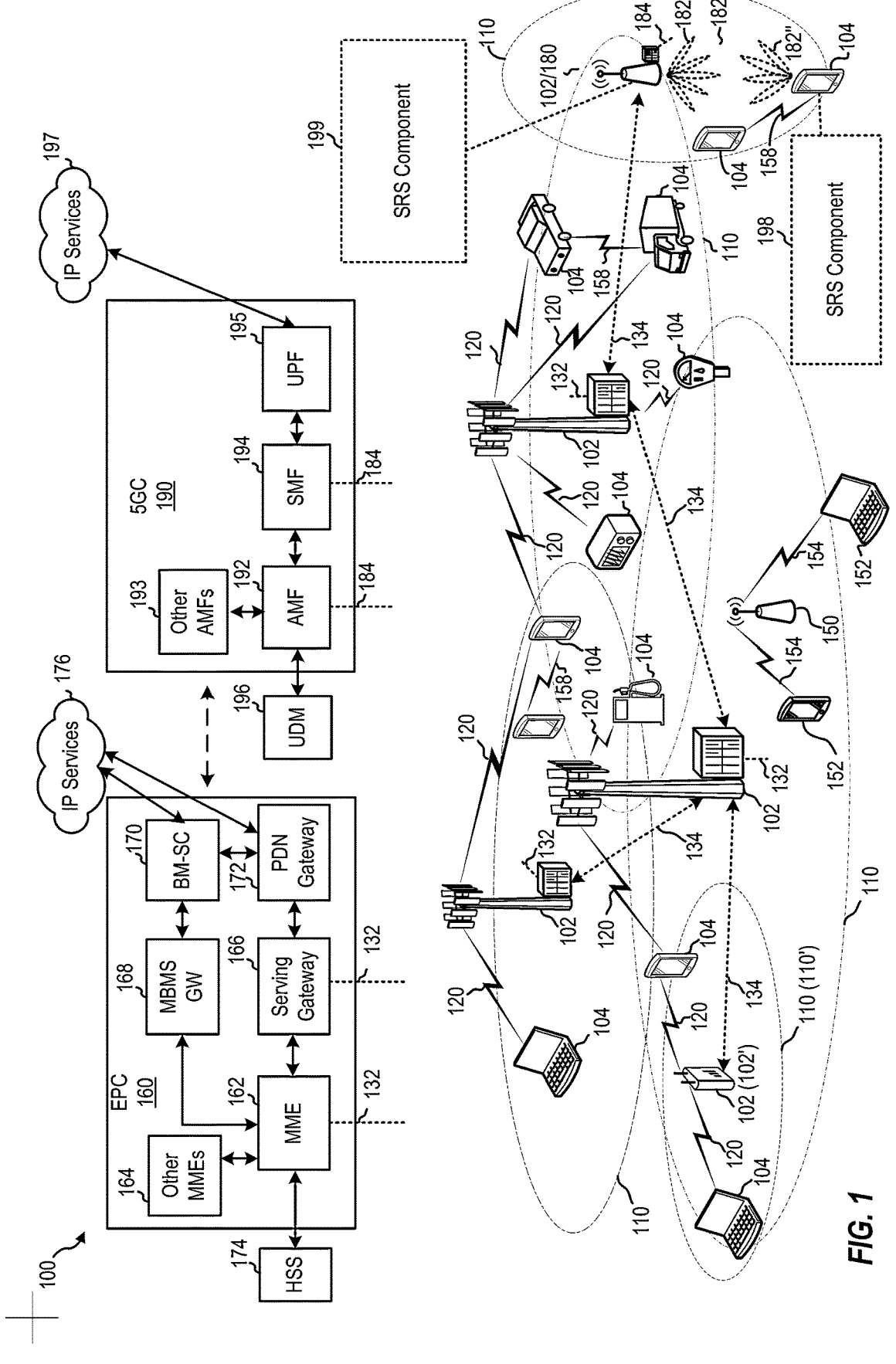
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes SRS component 199, which may be configured to perform operations 1200 of FIG. 12 to receive and process SRS from a UE multiplexed according to aspects of the present disclosure. Wireless network 100 further includes SRS component 198, which may be used configured to operations 1100 of FIG. 11 to transmit SRS from multiple antenna ports multiplexed according to aspects of the present disclosure.

Figure 2:
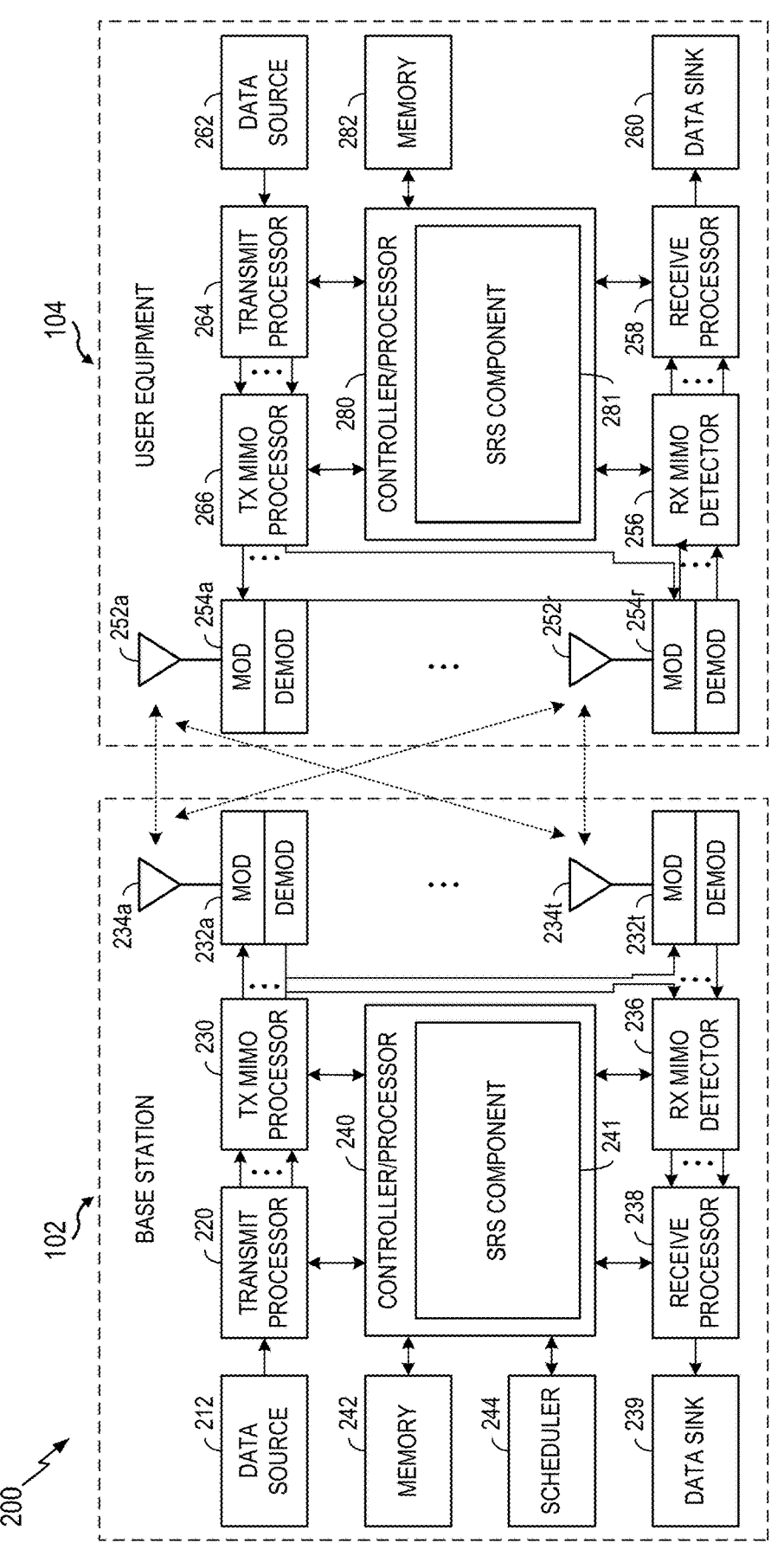
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes SRS component 241, which may be representative of SRS component 199 of FIG. 1. Notably, while depicted as an aspect of controller/processor 240, SRS component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes SRS component 281, which may be representative of SRS component 198 of FIG. 1. Notably, while depicted as an aspect of controller/processor 280, SRS component 281 may be implemented additionally or alternatively in various other aspects of user equipment 104 in other implementations.

Figures 3A, 3B, 3C, 3D:
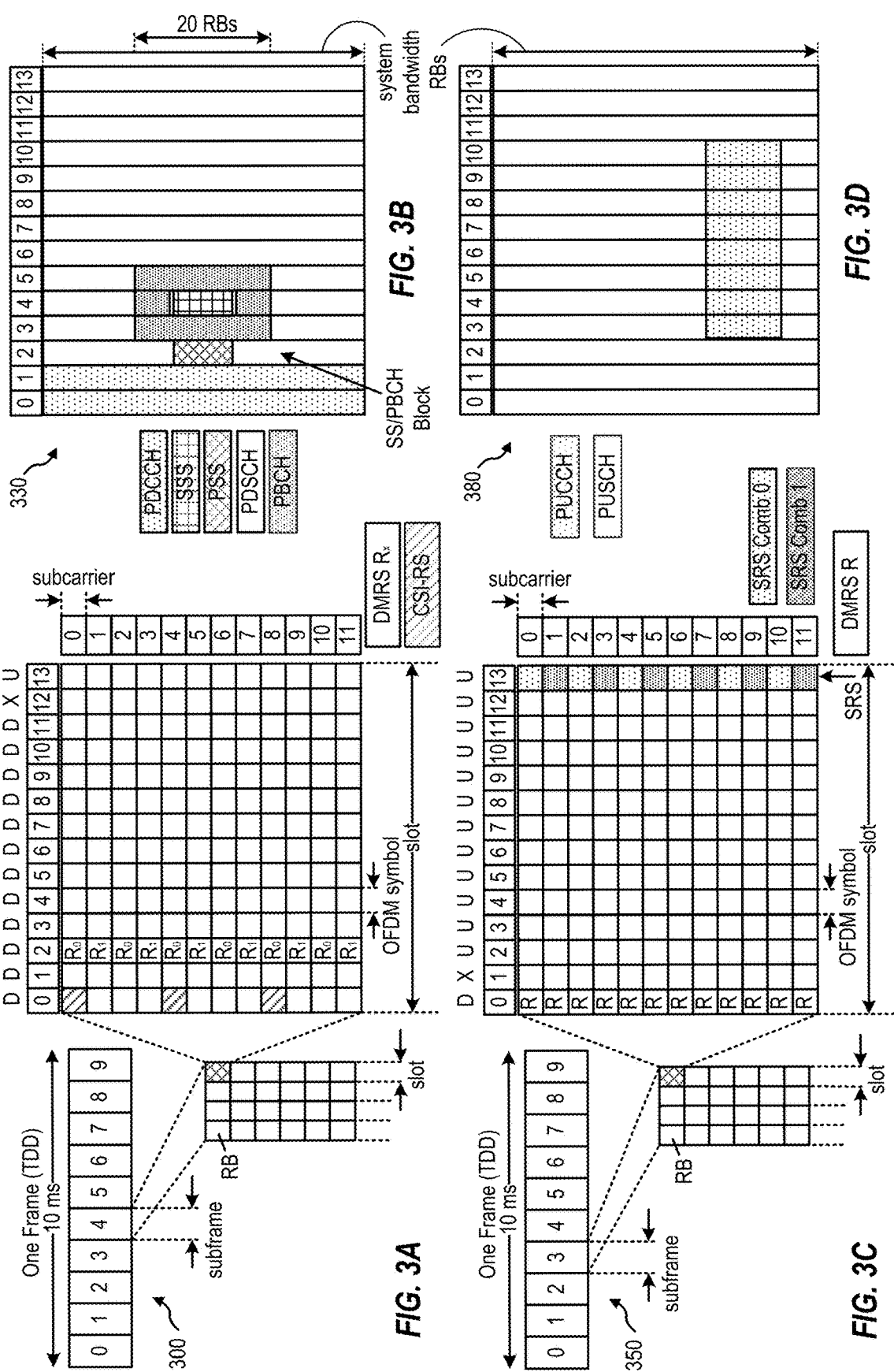
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mm Wave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Aspects Related to SRS Multiplexing for NTN

Aspects of the present disclosure provide techniques that utilize different SRS comb structures to multiplex SRS transmissions from different antenna ports across different symbols.

Aspects of the present disclosure propose hopping SRS comb structures across symbols. Utilizing separate SRS combs for each antenna port, and hopping to a different SRS comb for each antenna port across symbols may result in a robustness to phase discontinuity. In some cases, separate power amplifiers (PAs) can be used for each port, which may help potential issues where SRS transmission are power limited in certain deployments, such as non-terrestrial networks (NTNs).

According to a first proposal, SRS comb hopping may be applied for an SRS antenna port meaning, in different symbols, a different SRS comb structure may be used to transmit SRS from the same antenna port.

This may be understood with reference to the example shown in FIG. 4A. In a first OFDM symbol, the UE may choose a comb of size K (e.g., an even number 8 in the illustrated example) with a first offset for a first antenna port (P1). In a second OFDM symbol, the UE chooses a second comb of size K but with a second offset for P1 (e.g., with the second offset corresponding to a shift in frequency by K/2 tones).

In the example illustrated in FIG. 4A, there are two antenna ports (P1 and P2) and the comb size K=8. As illustrated, the UE chooses a first offset of 0 for P1 for the first symbol and a second offset of 4 for P1 for the second symbol. Conversely, the UE chooses the second offset of 4 for P2 for the first symbol and the first offset of 0 for P2 the second symbol. FIG. 4C shows another example, again with K=8, but with the second offset of 2.

One potential benefit of this approach is that it may prove robust to phase discontinuity. If phase continuity is maintained, however, then the SRS signals of the two OFDM symbols (of FIG. 4A) may be collapsed into a single vector gives a comb of size K/2 (which may be better at estimating long CIR than comb of size K). An example of this collapsing is shown in FIG. 4B. Otherwise, the UE may still choose to have two separate combs of size K. In some cases, in one OFDM symbol, two PAs may be used simultaneously for SRS transmissions, one for each port.

Within each comb, a cyclic shift may still be used to multiplex SRSs from multiple ports of the same UE. This concept can be generalized for m (m>2) ports with the shift being K/m tones staggered for each of the m ports.

For example, FIG. 5A illustrates an example with a comb size of 8 (K=8) and 4 ports (m=4). As shown, a shift of 2 tones (K/m=8/4=2) is staggered for each of the 4 ports occurs across each symbol. Collapsing SRS of port 1 in four OFDM symbols may give a comb of size 2.

Figure 5B:
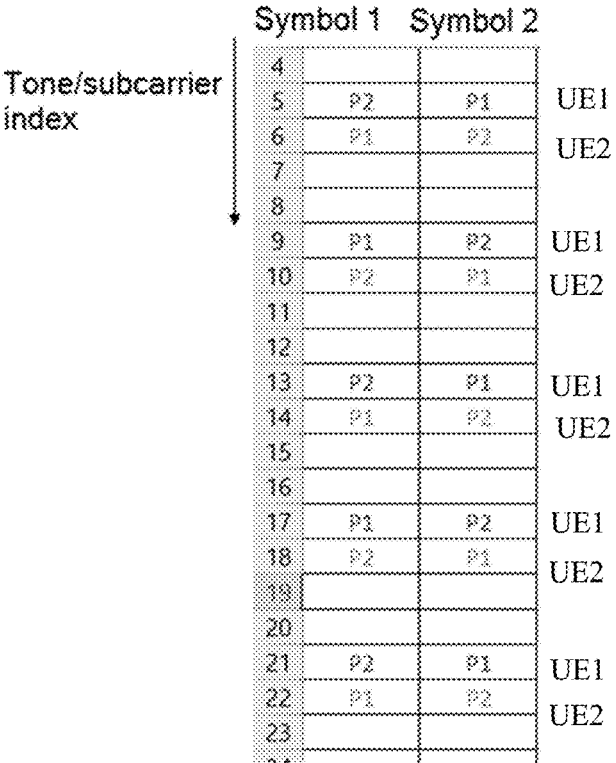

As illustrated in FIG. 5B, in some cases, different UEs may have their SRS transmissions frequency division multiplexed (FDM'd) in the same symbol(s). In other words, different UEs may be assigned different tones for their SRS antenna ports. In the illustrated example, UE1 is assigned tones 1, 9, and 17 in the first symbol and tones 5, 13, and 21 in the second symbol for its antenna port P1 and tones 5, 13, and 21 in the first symbol and tones 1, 9, and 17 in the second symbol for its antenna port P2. On the other hand, UE2 is assigned tones 2, 6, 10, 14, 18, and 22 in the first symbol for its antenna port P1 and tones 2, 6, 10, 14, 18, and 22 in the second symbol for its antenna port P2.

According to a second proposal, a UE can perform code division multiplexing (CDM) on SRSs among ports from a UE, which may help to take advantage of slow channel variation (if present) and the availability of two PAs. In some cases, both PAS can be set to the maximum transmit power.

Figure 6:
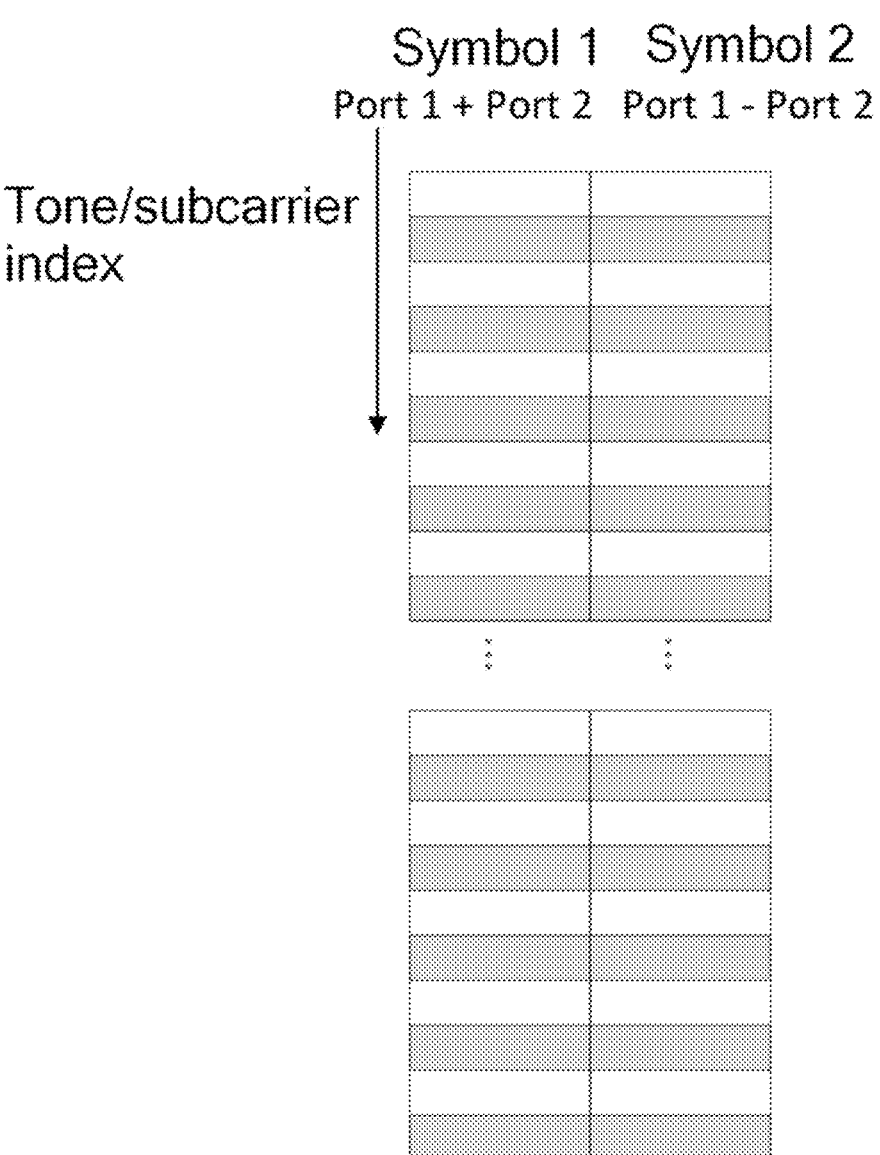
FIG. 6 depicts an example of SRS multiplexing with code division multiplexing (CDM), according to aspects of the present disclosure

FIG. 6 illustrates an example of using CDM across symbols, with a Comb-2 structure over 2 OFDM symbols. In the illustrated example, the spreading code is +1, +1 for the first port (Port 1) over two OFDM symbols, while the spreading code is +1, −1 for the second port (Port 2). One benefit of this approach may be a processing gain (e.g., of 3 dB SNR) over a time division multiplexed (TDM) scheme where the first port is only in the first OFDM symbol and the second port is only in the second OFDM symbol (e.g., as shown for UE 2 in FIG. 5B).

In some cases, the SRSs from different ports of the same UE may be CDM'd, where the CDM may be across time, across frequency, or both. For CDM across time, the involved resources may be within a same slot or across slots.

In some cases, each antenna port may use a separate power amplifier and transmit at the maximum power. As noted above, the UE may be an NTN device. In some cases, a base station may detect a phase discontinuity (abrupt change in phase) between symbols where SRS signals are located and correct it before demultiplexing the SRS signals from different SRS ports.

Aspects Related to Different SRS Comb Sizes

In the current systems, only a limited set of SRS comb sizes may be allowed (e.g., even comb sizes 2, 4, 8). In some cases, these sizes may lead to inefficient use of the frequency resources for narrow PUSCH allocations.

Figures 7A, 7B, 7C:
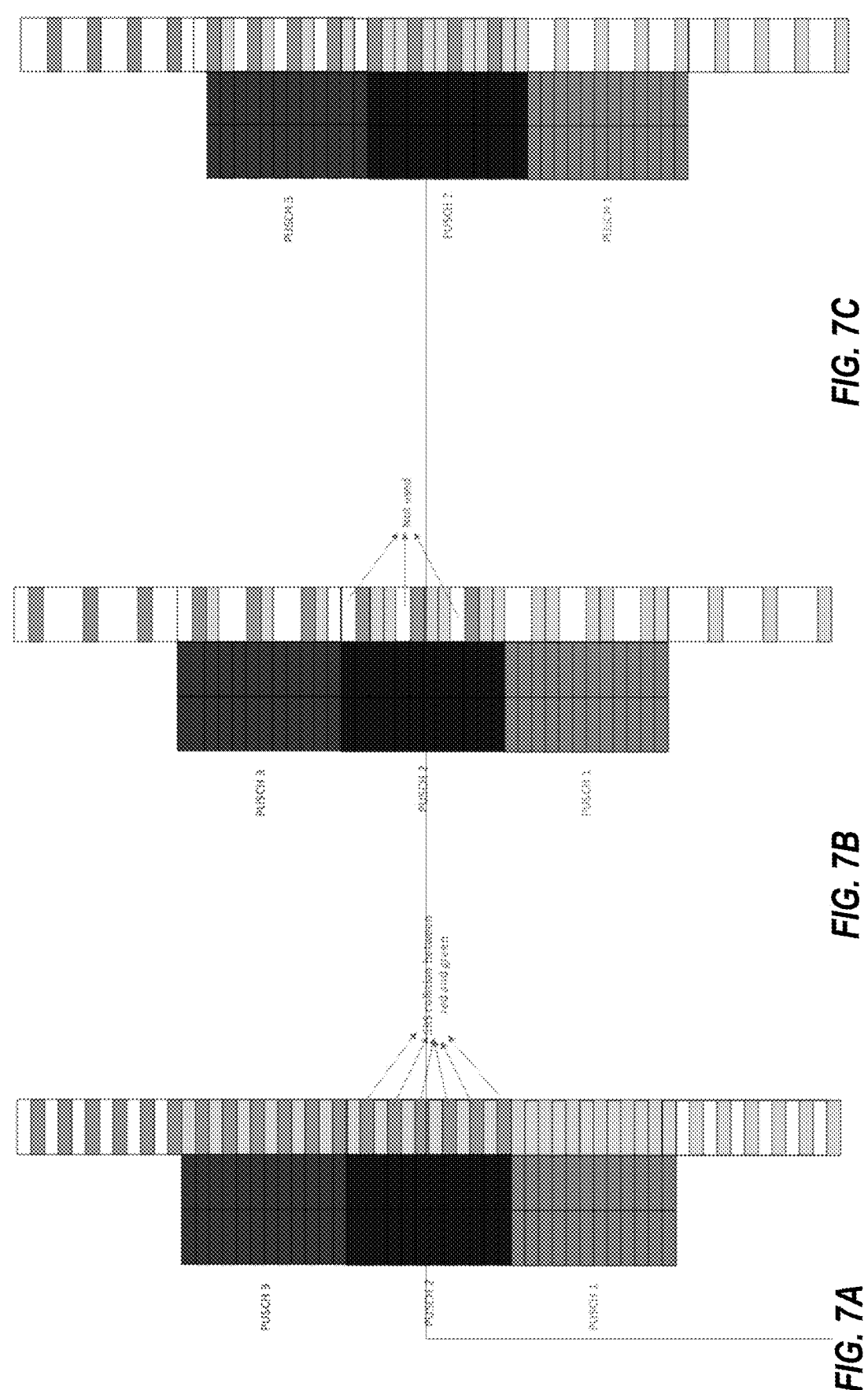
FIGS. 7A, 7B, and 7C depict example comb sizes, according to aspects of the present disclosure.

For example, as illustrated in FIG. 7A, a comb size of 2 may lead to SRS collisions. As illustrated in FIG. 7B, a comb size of 4 may lead to unused tones (a waste of resources). As illustrated in FIG. 7C, however, an odd comb size (e.g., a comb size of 3), may avoid collisions and also reduce a number of unused tones.

In NTN, the large number of beams and the frequency reuse make it beneficial to have other SRS comb sizes. As for narrow PUSCH allocation (e.g., 1RB), a UE may use SRS with a same bandwidth with contiguous tones to mitigate the edge effect in channel estimation and avoid SRS resource collision or inefficient use of frequency resources.

Figure 8:
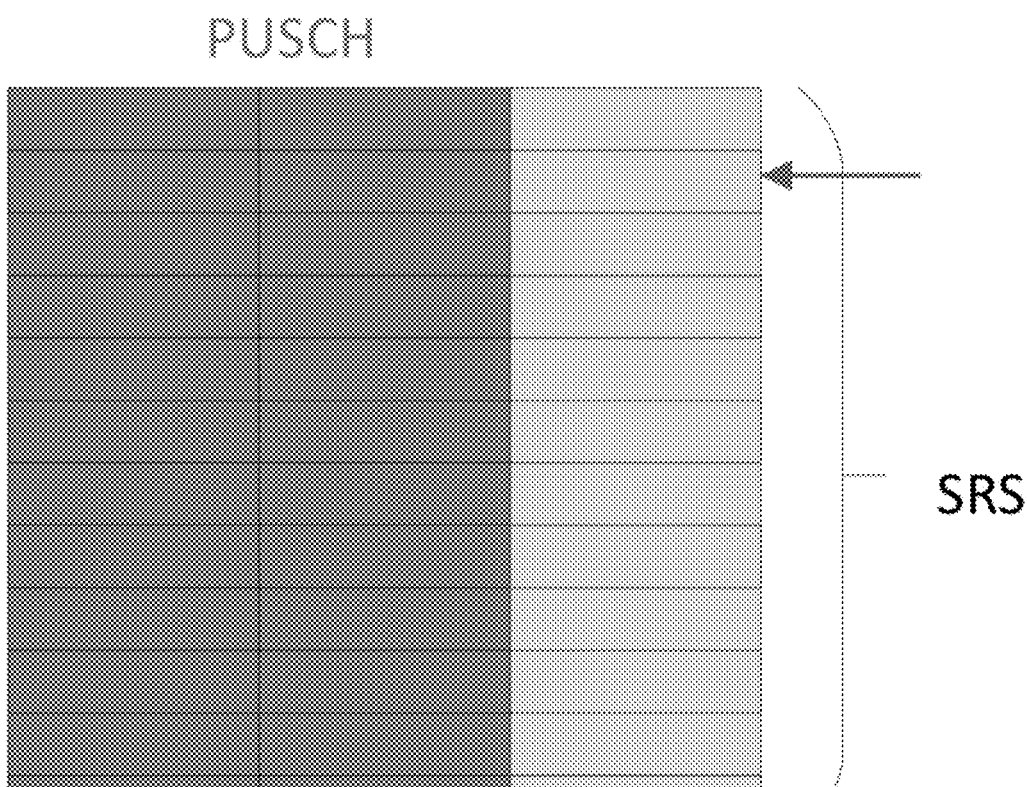
FIG. 8 depicts an example comb size of one, according to aspects of the present disclosure.

Alternatively, the SRS bandwidth can be made equal to the PUSCH bandwidth. In such cases, to mitigate the edge effect, the comb size may be made equal to 1 (contiguous tones). FIG. 8 illustrates an example of a comb size of 1. In the illustrated example, the tone pointed at by the arrow (that would not exist in the current spec, i.e., comb size=2, 4, 8) may help mitigate the edge effect. The edge effect generally refers to a phenomenon that can occur if there are not enough tones surrounding an SRS tone that is on the edge of a frequency interval for which the channel is to be estimated, where the surrounding tones can be used for interpolation in estimating the channel at the SRS tone.

Another motivation to use comb sizes other than even sizes (e.g., other than 2, 4, 8) is to support frequency reuse in NTN. In NTN, a large number of beams (>100) may be used for the uplink. FIG. 9A shows a basic NTN beam structure. FIG. 9B illustrates how this basic beam structure may be repeated. A frequency reuse factor may be greater than 1 for spectrum efficiency.

To mitigate interference among uplink beams on the same frequency, each beam may use an SRS on a different comb. The desired comb size may not be any number among 2, 4, and 8. For example, because the basic beam structure of FIG. 9A has a beam at the center, surrounded by 6 other beams, the desired comb size may be 7. For SRS of bandwidth 28RBs, this gives a sequence length of 48, which may be a supported FFT size in the current NR spec.

Aspects of the present disclosure may support a comb size other than 2, 4, 8 (e.g., 3, 5, 6, 7, . . . ). In some cases, the network may determine and signal the comb sizes to be supported (e.g., via SIB, RRC). In some cases, the network may encode the supported comb sizes.

For PUSCH bandwidth that is less than a threshold (e.g., 1RB), the network may configure the SRS with a comb size equal to 1 (i.e., contiguous tones as shown in FIG. 8). As noted above, in some cases, the bandwidth of the SRS may be equal to the PUSCH bandwidth. As described above with reference to FIG. 7C, using a comb-3 may address issues related to comb-2 and comb-4.

According to a fourth proposal, pre-compensation epochs may be provided for SRS and PUCCH repetitions. For example, for uplink coverage enhancement, the SRS may be transmitted multiple times within a slot or across multiple slots. To make the transmission phase coherent, it may be important for the UE to not perform pre-compensations, such as timing advance adjustment and frequency adjustment.

Rather, according to aspects of the present disclosure, the network may configure pre-compensation time instants (epochs) at which a UE is allowed to adjust time and/or frequency pre-compensations for SRS repetitions and/or PUCCH repetitions. As illustrated in FIG. 10, these epochs may be on the boundaries of slots or subframes.

In some cases, the duration between two epochs may depend on various satellite properties. For example, such satellite properties may include one or more of: altitude of the satellite, relative angle between the UE and the satellite, relative angle between the satellite and the gNB/GW, parameters provided to derive $N_{TA}$,common (a common timing advance that is common to multiple UEs), a CP duration (a larger CP tolerates long duration of not doing TA adjustment), or subcarrier spacing (SCS).

As an example, for SRS repetitions across multiple slots, the pre-compensation epochs may be configured such that the SRS repetitions are included in a time interval between two adjacent pre-compensation epochs. The UE may apply the same TA during the time interval to allow for coherent processing of the SRS repetitions at the network.

Example Methods

FIG. 11 shows an example of a method 1100 for transmitting SRS, by a UE, with comb hopping for different antenna ports in a symbol according to aspects of the present disclosure. In some aspects, a user equipment, such as UE 104 in FIGS. 1 and 2, or processing system 1305 of FIG. 13, may perform the method 1100.

At operation 1105, the UE transmits a first SRS, from a first antenna port in a first symbol, on one or more tones determined by a first comb size and a first tone offset. In some cases, the operations of this step refer to, or may be performed by, first antenna port circuitry as described with reference to FIG. 11.

At operation 1110, the UE transmits a second SRS, from a second antenna port in the first symbol, on one or more tones determined by the first comb size and a second tone offset different than the first tone offset. In some cases, the operations of this step refer to, or may be performed by, second antenna port circuitry as described with reference to FIG. 13.

At operation 1115, the UE transmits a third SRS, from the first antenna port in a second symbol, on one or more tones determined by the first comb size and the second tone offset. In some cases, the operations of this step refer to, or may be performed by, first antenna port circuitry as described with reference to FIG. 13.

At operation 1120, the system transmits a fourth SRS, from the second antenna port in the second symbol, on one or more tones determined by the first comb size and the first tone offset. In some cases, the operations of this step refer to, or may be performed by, second antenna port circuitry as described with reference to FIG. 13.

In some aspects, a frequency shift associated with a difference between the first and second tone offsets is determined based on the first comb size and number of antenna ports. In some aspects, the first SRS is transmitted from the first port using a first PA and the second SRS is transmitted from the second port using a second PA. In some aspects, the first plurality of SRS and the second plurality of SRS are transmitted to a NTN.

In some aspects, the first SRS is transmitted from the first antenna port with a different cyclic shift than the second SRS transmitted from the second antenna port. In some aspects, the SRS are FDM with SRS transmitted by one or more other UEs. In some aspects, the first and second spreading codes result in code division multiplexing across time, frequency, or both time and frequency.

In some aspects, method 1100 further includes using a first spreading code when transmitting the first and third SRS from the first antenna port in the first and second symbols. Some examples further include using a second spreading code when transmitting the second and fourth SRS from the second antenna port in the first and second symbols.

In some aspects, method 1100 further includes receiving signaling indicating when the UE is allowed to perform at least one of time pre-compensation or frequency pre-compensation. Some examples further include performing pre-compensation for SRS transmissions in accordance with the indication.

In some aspects, the indication indicates the UE is allowed to perform at least one of time pre-compensation or frequency pre-compensation at slot boundaries or subframe boundaries. In some aspects, a duration between slot boundaries or subframe boundaries on which the UE is allowed to perform at least one of time pre-compensation or frequency pre-compensation is based on at least one of: satellite properties, parameters provided to derive a TA, a CP duration, or a subcarrier spacing.

In some aspects, method 1100 further includes receiving signaling indicating the comb size. In some aspects, the signaling indicates the UE is to use the comb size when the first and second SRS are transmitted with a PUSCH having a bandwidth less than a threshold value. In some aspects, the comb size comprises an odd number.

FIG. 12 shows an example of a method 1200 for processing, by a network entity, multiplexed SRS transmissions sent with comb hopping from different antenna ports in a symbol according to aspects of the present disclosure. In some aspects, a base station, such as base station 102 in FIGS. 1 and 2, or processing system 1405 of FIG. 14, may perform the method 1200.

At operation 1205, the network entity receives, from a UE, a first SRS, transmitted from a first antenna port in a first symbol, on one or more tones determined by a first comb size and a first tone offset. In some cases, the operations of this step refer to, or may be performed by, comb hopping circuitry as described with reference to FIG. 14.

At operation 1210, the network entity receives, from the UE, a second SRS, transmitted from a second antenna port in the first symbol, on one or more tones determined by the first comb size and a second tone offset different than the first tone offset. In some cases, the operations of this step refer to, or may be performed by, comb hopping circuitry as described with reference to FIG. 14.

At operation 1215, the network entity receives a third SRS, transmitted from the first antenna port in a second symbol, on one or more tones determined by the first comb size and the second tone offset. In some cases, the operations of this step refer to, or may be performed by, comb hopping circuitry as described with reference to FIG. 14.

At operation 1220, the network entity receives a fourth SRS, transmitted from the second antenna port in the second symbol, on one or more tones determined by the first comb size and the first tone offset. In some cases, the operations of this step refer to, or may be performed by, comb hopping circuitry as described with reference to FIG. 14.

In some aspects, a frequency shift associated with a difference between the first and second tone offsets is determined based on the first comb size and number of antenna ports. In some aspects, the network entity comprises a base station of a NTN. In some aspects, the first SRS is transmitted with a different cyclic shift than the second SRS. In some aspects, the SRS are FDM with SRS transmitted by one or more other UEs.

In some aspects, method 1200 further includes using a first spreading code to process the first and third SRS. Some examples further include using a second spreading code to process the second and fourth SRS.

In some aspects, method 1200 further includes transmitting signaling, to the UE, indicating the comb size. In some aspects, the signaling indicates the UE is to use the comb size when the first and second SRS are transmitted with a PUSCH having a bandwidth less than a threshold value. In some aspects, the comb size comprises an odd number.

In some aspects, method 1200 further includes transmitting signaling indicating when the UE is allowed to perform at least one of time pre-compensation or frequency pre-compensation for SRS transmissions. In some aspects, the indication indicates the UE is allowed to perform at least one of time pre-compensation or frequency pre-compensation at slot boundaries or subframe boundaries.

In some aspects, method 1200 further includes determining a duration between slot boundaries or subframe boundaries on which the UE is allowed to perform at least one of time pre-compensation or frequency pre-compensation, based on at least one of: satellite properties, parameters provided to derive a TA, a CP duration, or a subcarrier spacing.

Example Wireless Communication Devices

Figure 13:
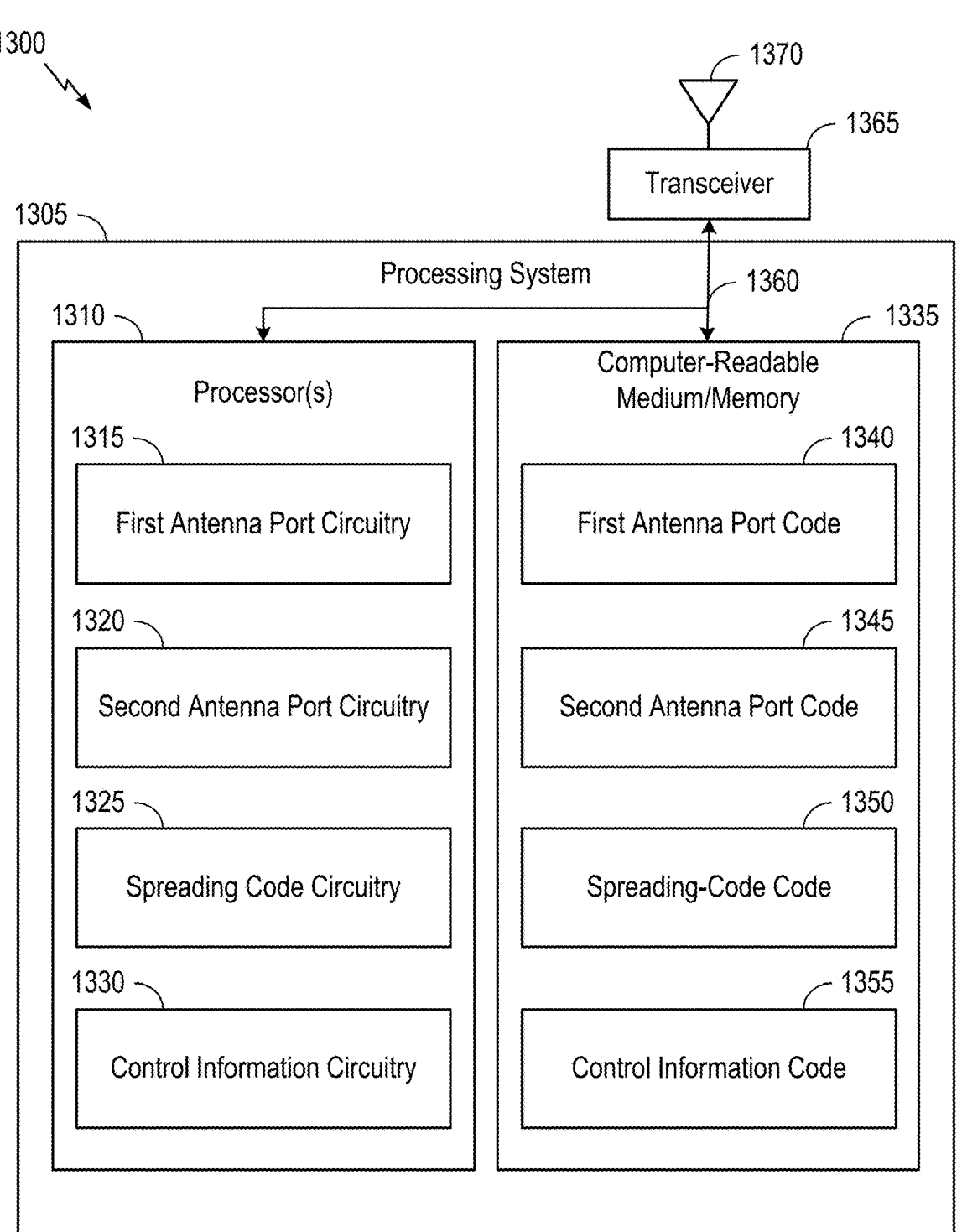
FIGS. 13 through 14 show examples of a communications device according to aspects of the present disclosure.

FIG. 13 depicts an example communications device 1300 that includes various components operable, configured, or adapted to perform operations for the techniques disclosed herein, such as the operations depicted and described with respect to FIG. 11. In some examples, communication device may be a user equipment 104 as described, for example with respect to FIGS. 1 and 2.

Communications device 1300 includes a processing system 1305 coupled to a transceiver 1365 (e.g., a transmitter and/or a receiver). Transceiver 1365 is configured to transmit (or send) and receive signals for the communications device 1300 via an antenna 1370, such as the various signals as described herein. Processing system 1305 may be configured to perform processing functions for communications device 1300, including processing signals received and/or to be transmitted by communications device 1300.

Processing system 1305 includes one or more processors 1310 coupled to a computer-readable medium/memory 1335 via a bus 1360. In certain aspects, computer-readable medium/memory 1335 is configured to store instructions (e.g., computer-executable code) that when executed by the one or more processors 1310, cause the one or more processors 1310 to perform the operations illustrated in FIG. 11, or other operations for performing the various techniques discussed herein.

Various components of communications device 1300 may provide means for performing the methods described herein, including with respect to FIG. 11.

In some examples, means for transmitting or sending (or means for outputting for transmission) may include the transceivers 254 and/or antenna(s) 252 of the user equipment 104 illustrated in FIG. 2 and/or transceiver 1365 and antenna 1370 of the communication device in FIG. 13.

In some examples, means for receiving (or means for obtaining) may include the transceivers 254 and/or antenna(s) 252 of the user equipment 104 illustrated in FIG. 2 and/or transceiver 1365 and antenna 1370 of the communication device in FIG. 13.

In some examples, means for processing may include various processing system 1305 components, such as: the one or more processors 1310 in FIG. 13, or aspects of the user equipment 104 depicted in FIG. 2, including receive processor 258, transmit processor 264, TX MIMO processor 266, and/or controller/processor 280.

In one aspect, one or more processors 1310 includes first antenna port circuitry 1315, second antenna port circuitry 1320, spreading code circuitry 1325, and control information circuitry 1330.

According to some aspects, first antenna port circuitry 1315 transmits a first SRS, from a first antenna port in a first symbol, on one or more tones determined by a first comb size and a first tone offset. In some examples, first antenna port circuitry 1315 transmits a third SRS, from the first antenna port in a second symbol, on one or more tones determined by the first comb size and the second tone offset.

According to some aspects, second antenna port circuitry 1320 transmits a second SRS, from a second antenna port in the first symbol, on one or more tones determined by the first comb size and a second tone offset different than the first tone offset. In some examples, second antenna port circuitry 1320 transmits a fourth SRS, from the second antenna port in the second symbol, on one or more tones determined by the first comb size and the first tone offset. In some examples, a frequency shift associated with a difference between the first and second tone offsets is determined based on the first comb size and number of antenna ports. In some examples, the first SRS is transmitted from the first port using a first PA and the second SRS is transmitted from the second port using a second PA. In some examples, the first set of SRS and the second set of SRS are transmitted to a NTN. In some examples, the first SRS is transmitted from the first antenna port with a different cyclic shift than the second SRS transmitted from the second antenna port. In some examples, the SRS are FDM with SRS transmitted by one or more other UEs.

According to some aspects, spreading code circuitry 1325 uses a first spreading code when transmitting the first and third SRS from the first antenna port in the first and second symbols. In some examples, spreading code circuitry 1325 uses a second spreading code when transmitting the second and fourth SRS from the second antenna port in the first and second symbols. In some examples, the first and second spreading codes result in code division multiplexing across time, frequency, or both time and frequency.

According to some aspects, control information circuitry 1330 receives signaling indicating the comb size. In some examples, the comb size includes an odd number. In some examples, the signaling indicates the UE is to use the comb size when the first and second SRS are transmitted with a PUSCH having a bandwidth less than a threshold value. In some examples, control information circuitry 1330 receives signaling indicating when the UE is allowed to perform at least one of time pre-compensation or frequency pre-compensation. In some examples, control information circuitry 1330 performs pre-compensation for SRS transmissions in accordance with the indication. In some examples, the indication indicates the UE is allowed to perform at least one of time pre-compensation or frequency pre-compensation at slot boundaries or subframe boundaries. In some examples, a duration between slot boundaries or subframe boundaries on which the UE is allowed to perform at least one of time pre-compensation or frequency pre-compensation is based on at least one of: satellite properties, parameters provided to derive a TA, a CP duration, or a subcarrier spacing.

In some examples, one or more processors 1310 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1310 are configured to operate a memory array using a memory controller. In other cases, a memory controller is integrated into the one or more processors 1310. In some cases, the one or more processors 1310 are configured to execute computer-readable instructions stored in a memory to perform various functions. In some aspects, one or more processors 1310 include special purpose components for modem processing, baseband processing, digital signal processing, or transmission processing.

In one aspect, computer-readable medium/memory 1335 includes (e.g., stores) first antenna port code 1340, second antenna port code 1345, spreading-code code 1350, and control information code 1355.

Examples of computer-readable medium/memory 1330 include random access memory (RAM), read-only memory (ROM), or a hard disk. Examples of memory devices include solid state memory and a hard disk drive. In some examples, computer-readable medium/memory 1330 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Notably, FIG. 13 is just one example, and many other examples and configurations of communications device 1300 are possible.

Figure 14:
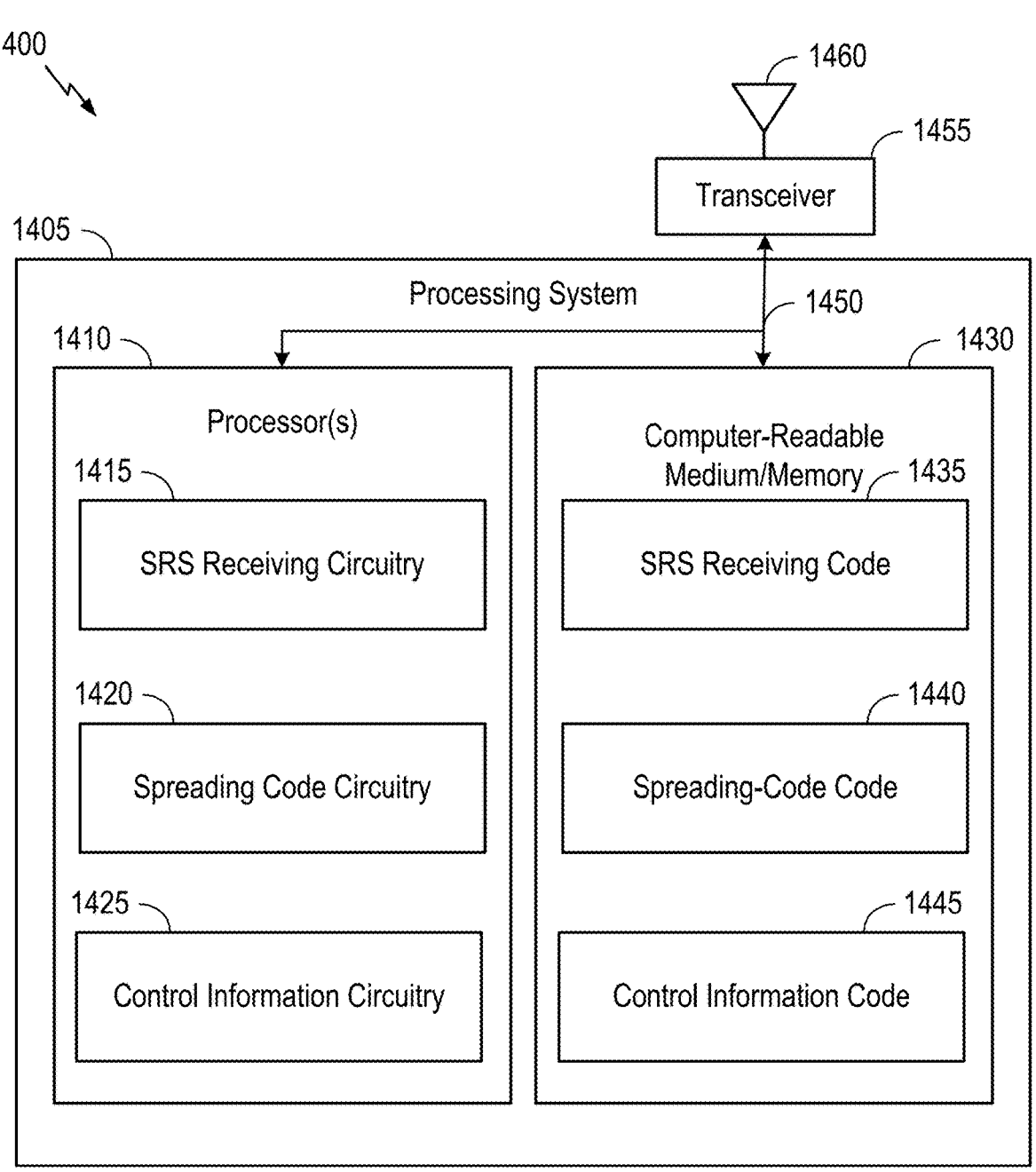

FIG. 14 depicts an example communications device 1400 that includes various components operable, configured, or adapted to perform operations for the techniques disclosed herein, such as the operations depicted and described with respect to FIG. 12. In some examples, communication device may be a base station 102 as described, for example with respect to FIGS. 1 and 2.

Communications device 1400 includes a processing system 1405 coupled to a transceiver 1455 (e.g., a transmitter and/or a receiver). Transceiver 1455 is configured to transmit (or send) and receive signals for the communications device 1400 via an antenna 1460, such as the various signals as described herein. Processing system 1405 may be configured to perform processing functions for communications device 1400, including processing signals received and/or to be transmitted by communications device 1400.

Processing system 1405 includes one or more processors 1410 coupled to a computer-readable medium/memory 1430 via a bus 1450. In certain aspects, computer-readable medium/memory 1430 is configured to store instructions (e.g., computer-executable code) that when executed by the one or more processors 1410, cause the one or more processors 1410 to perform the operations illustrated in FIG. 12, or other operations for performing the various techniques discussed herein.

In some examples, one or more processors 1410 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1410 are configured to operate a memory array using a memory controller. In other cases, a memory controller is integrated into the one or more processors 1410. In some cases, the one or more processors 1410 are configured to execute computer-readable instructions stored in a memory to perform various functions. In some aspects, one or more processors 1410 include special purpose components for modem processing, baseband processing, digital signal processing, or transmission processing.

In one aspect, computer-readable medium/memory 1430 includes (e.g., stores) comb hopping code 1435, spreading-code code 1440, and control information code 1445.

Examples of computer-readable medium/memory 1430 include random access memory (RAM), read-only memory (ROM), or a hard disk. Examples of memory devices include solid state memory and a hard disk drive. In some examples, computer-readable medium/memory 1430 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A transceiver 1455 may communicate bi-directionally, via antennas 1460, wired, or wireless links as described above. For example, the transceiver 1455 may represent a wireless transceiver 1455 and may communicate bi-directionally with another wireless transceiver 1455. The transceiver 1455 may also include or be connected to a modem to modulate the packets and provide the modulated packets to for transmission, and to demodulate received packets. In some examples, transceiver 1455 may be tuned to operate at specified frequencies. For example, a modem can configure the transceiver 1455 to operate at a specified frequency and power level based on the communication protocol used by the modem.

Various components of communications device 1400 may provide means for performing the methods described herein, including with respect to FIG. 12.

In some examples, means for transmitting or sending (or means for outputting for transmission) may include the transceivers 232 and/or antenna(s) 234 of the base station 102 illustrated in FIG. 2 and/or transceiver 1455 and antenna 1460 of the communication device in FIG. 14.

In some examples, means for receiving (or means for obtaining) may include the transceivers 232 and/or antenna(s) 234 of the base station illustrated in FIG. 2 and/or transceiver 1455 and antenna 1460 of the communication device in FIG. 14.

In some examples, means for processing may include various processing system 1405 components, such as: the one or more processors 1410 in FIG. 14, or aspects of the base station 102 depicted in FIG. 2, including receive processor 238, transmit processor 220, TX MIMO processor 230, and/or controller/processor 240.

In one aspect, one or more processors 1410 includes comb hopping circuitry 1415, spreading code circuitry 1420, and comb size circuitry 1425.

According to some aspects, comb hopping circuitry 1415 receives, from a UE, a first SRS, transmitted from a first antenna port in a first symbol, on one or more tones determined by a first comb size and a first tone offset. In some examples, comb hopping circuitry 1415 receives, from the UE, a second SRS, transmitted from a second antenna port in the first symbol, on one or more tones determined by the first comb size and a second tone offset different than the first tone offset. In some examples, comb hopping circuitry 1415 receives a third SRS, transmitted from the first antenna port in a second symbol, on one or more tones determined by the first comb size and the second tone offset. In some examples, comb hopping circuitry 1415 receives a fourth SRS, transmitted from the second antenna port in the second symbol, on one or more tones determined by the first comb size and the first tone offset. In some examples, a frequency shift associated with a difference between the first and second tone offsets is determined based on the first comb size and number of antenna ports. In some examples, the network entity includes a base station of a NTN. In some examples, the first SRS is transmitted with a different cyclic shift than the second SRS. In some examples, the SRS are FDM with SRS transmitted by one or more other UEs.

According to some aspects, spreading code circuitry 1420 uses a first spreading code to process the first and third SRS. In some examples, spreading code circuitry 1420 uses a second spreading code to process the second and fourth SRS.

According to some aspects, control information circuitry 1425 transmits signaling, to the UE, indicating the comb size. In some examples, the signaling indicates the UE is to use the comb size when the first and second SRS are transmitted with a PUSCH having a bandwidth less than a threshold value. In some examples, the comb size includes an odd number. In some examples, control information circuitry 1425 transmits signaling indicating when the UE is allowed to perform at least one of time pre-compensation or frequency pre-compensation for SRS transmissions. In some examples, the indication indicates the UE is allowed to perform at least one of time pre-compensation or frequency pre-compensation at slot boundaries or subframe boundaries. In some examples, control information circuitry 1425 determines a duration between slot boundaries or subframe boundaries on which the UE is allowed to perform at least one of time pre-compensation or frequency pre-compensation, based on at least one of: satellite properties, parameters provided to derive a TA, a CP duration, or a subcarrier spacing.

Notably, FIG. 14 is just one example, and many other examples and configurations of communication device 1400 are possible.

Example Clauses

Implementation examples are described in the following numbered clauses:

Clause 1: A method, comprising: transmitting a first SRS, from a first antenna port in a first symbol, on one or more tones determined by a first comb size and a first tone offset; transmitting a second SRS, from a second antenna port in the first symbol, on one or more tones determined by the first comb size and a second tone offset different than the first tone offset; transmitting a third SRS, from the first antenna port in a second symbol, on one or more tones determined by the first comb size and the second tone offset; and transmitting a fourth SRS, from the second antenna port in the second symbol, on one or more tones determined by the first comb size and the first tone offset.

Clause 2: The method of Clause 1, wherein: a frequency shift associated with a difference between the first and second tone offsets is determined based on the first comb size and number of antenna ports.

Clause 3: The method of any one of Clauses 1 and 2, wherein: the first SRS is transmitted from the first port using a first PA and the second SRS is transmitted from the second port using a second PA.

Clause 4: The method of any one of Clauses 1-3, wherein: the first plurality of SRS and the second plurality of SRS are transmitted to a NTN.

Clause 5: The method of any one of Clauses 1-4, wherein: the first SRS is transmitted from the first antenna port with a different cyclic shift than the second SRS transmitted from the second antenna port.

Clause 6: The method of any one of Clauses 1-5, wherein: the SRS are FDM with SRS transmitted by one or more other UEs.

Clause 7: The method of any one of Clauses 1-6, comprising: using a first spreading code when transmitting the first and third SRS from the first antenna port in the first and second symbols; and using a second spreading code when transmitting the second and fourth SRS from the second antenna port in the first and second symbols.

Clause 8: The method of Clause 7, wherein: the first and second spreading codes result in code division multiplexing across time, frequency, or both time and frequency.

Clause 9: The method of any one of Clauses 1-8, wherein: the comb size comprises an odd number.

Clause 10: The method of Clause 9, further comprising: receiving signaling indicating the comb size.

Clause 11: The method of Clause 10, wherein: the signaling indicates the UE is to use the comb size when the first and second SRS are transmitted with a PUSCH having a bandwidth less than a threshold value.

Clause 12: The method of any one of Clauses 1-11, further comprising: receiving signaling indicating when the UE is allowed to perform at least one of time pre-compensation or frequency pre-compensation; and performing pre-compensation for SRS transmissions in accordance with the indication.

Clause 13: The method of Clause 12, wherein: the indication indicates the UE is allowed to perform at least one of time pre-compensation or frequency pre-compensation at slot boundaries or subframe boundaries.

Clause 14: The method of Clause 13, wherein: a duration between slot boundaries or subframe boundaries on which the UE is allowed to perform at least one of time pre-compensation or frequency pre-compensation is based on at least one of: satellite properties, parameters provided to derive a TA, a CP duration, or a subcarrier spacing.

Clause 15: A method, comprising: receiving, from a UE, a first SRS, transmitted from a first antenna port in a first symbol, on one or more tones determined by a first comb size and a first tone offset; receiving, from the UE, a second SRS, transmitted from a second antenna port in the first symbol, on one or more tones determined by the first comb size and a second tone offset different than the first tone offset receiving a third SRS, transmitted from the first antenna port in a second symbol, on one or more tones determined by the first comb size and the second tone offset; and receiving a fourth SRS, transmitted from the second antenna port in the second symbol, on one or more tones determined by the first comb size and the first tone offset.

Clause 16: The method of Clause 15, wherein: a frequency shift associated with a difference between the first and second tone offsets is determined based on the first comb size and number of antenna ports.

Clause 17: The method of any one of Clauses 15 and 16, wherein: the network entity comprises a base station of a NTN.

Clause 18: The method of any one of Clauses 15-17, wherein: the first SRS is transmitted with a different cyclic shift than the second SRS.

Clause 19: The method of any one of Clauses 15-18, wherein: the SRS are FDM with SRS transmitted by one or more other UEs.

Clause 20: The method of any one of Clauses 15-19, comprising: using a first spreading code to process the first and third SRS; and using a second spreading code to process the second and fourth SRS.

Clause 21: The method of any one of Clauses 15-20, wherein: the comb size comprises an odd number.

Clause 22: The method of Clause 21, further comprising: transmitting signaling, to the UE, indicating the comb size.

Clause 23: The method of Clause 22, wherein: the signaling indicates the UE is to use the comb size when the first and second SRS are transmitted with a PUSCH having a bandwidth less than a threshold value.

Clause 24: The method of any one of Clauses 15-23, further comprising: transmitting signaling indicating when the UE is allowed to perform at least one of time pre-compensation or frequency pre-compensation for SRS transmissions.

Clause 25: The method of Clause 24, wherein: the indication indicates the UE is allowed to perform at least one of time pre-compensation or frequency pre-compensation at slot boundaries or subframe boundaries.

Clause 26: The method of Clause 25, further comprising: determining a duration between slot boundaries or subframe boundaries on which the UE is allowed to perform at least one of time pre-compensation or frequency pre-compensation, based on at least one of: satellite properties, parameters provided to derive a TA, a CP duration, or a subcarrier spacing.

Clause 27: An apparatus, comprising: a memory comprising computer-executable instructions; one or more processors configured to execute the computer-executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising computer-executable instructions that, when executed by one or more processors of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of SRS multiplexing via SRS comb hopping in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), the method comprising:
transmitting a first sounding reference signal (SRS), from a first antenna port in a first symbol, on one or more tones determined by a first comb size and a first tone offset;
transmitting a second SRS, from a second antenna port in the first symbol, on one or more tones determined by the first comb size and a second tone offset different than the first tone offset;

transmitting a third SRS, from the first antenna port in a second symbol, on one or more tones determined by the first comb size and the second tone offset; and transmitting a fourth SRS, from the second antenna port in the second symbol, on one or more tones determined by the first comb size and the first tone offset.

2. The method of claim 1, wherein a frequency shift associated with a difference between the first tone offset and the second tone offset is determined based on the first comb size and a number of antenna ports.

3. The method of claim 1, wherein:

the first SRS is transmitted from the first antenna port using a first power amplifier (PA); and the second SRS is transmitted from the second antenna port using a second PA.

4. The method of claim 1, wherein the first SRS and the second SRS are transmitted to a non-terrestrial network (NTN).

5. The method of claim 1, wherein the first SRS is transmitted from the first antenna port with a different cyclic shift than the second SRS transmitted from the second antenna port.

6. The method of claim 1, wherein at least one of: the first SRS, the second SRS, the third SRS or the fourth SRS is frequency division multiplexed (FDM) with SRS transmitted by one or more other UEs.

7. The method of claim 1, further comprising:

using a first spreading code when transmitting the first and third SRS from the first antenna port in the first symbol and the second symbols; and using a second spreading code when transmitting the second and fourth SRS from the second antenna port in the first symbol and the second symbols.

8. The method of claim 7, wherein the first spreading code and the second spreading code result in code division multiplexing across time, frequency, or both time and frequency.

9. The method of claim 1, wherein the first comb size comprises an odd number.

10. The method of claim 9, further comprising receiving signaling indicating the first comb size.

11. The method of claim 10, wherein the signaling indicates the UE is to use the first comb size when the first SRS and the second SRS are transmitted with a physical uplink shared channel (PUSCH) having a bandwidth less than a threshold value.

12. The method of claim 1, further comprising:

receiving signaling indicating when the UE is allowed to perform at least one of time pre-compensation or frequency pre-compensation; and performing pre-compensation for SRS transmissions in accordance with the indication.

13. The method of claim 12, wherein the signaling indicates the UE is allowed to perform at least one of time pre-compensation or frequency pre-compensation at slot boundaries or subframe boundaries.

14. The method of claim 13, wherein a duration between slot boundaries or subframe boundaries on which the UE is allowed to perform at least one of time pre-compensation or frequency pre-compensation is based on at least one of: satellite properties, parameters provided to derive a timing advance (TA), a cyclic prefix (CP) duration, or a subcarrier spacing.

15. A method for wireless communications, the method comprising:

receiving, from a user equipment (UE), a first sounding reference signal (SRS), transmitted from a first antenna port in a first symbol, on one or more tones determined by a first comb size and a first tone offset;

receiving, from the UE, a second SRS, transmitted from a second antenna port in the first symbol, on one or more tones determined by the first comb size and a second tone offset different than the first tone offset;

receiving a third SRS, transmitted from the first antenna port in a second symbol, on one or more tones determined by the first comb size and the second tone offset; and receiving a fourth SRS, transmitted from the second antenna port in the second symbol, on one or more tones determined by the first comb size and the first tone offset.

16. The method of claim 15, wherein a frequency shift associated with a difference between the first tone offset and the second tone offset is determined based on the first comb size and s number of antenna ports.

17. The method of claim 15, wherein the first SRS is transmitted with a different cyclic shift than the second SRS.

18. The method of claim 15, wherein at least one of: the first SRS, the second SRS, the third SRS or the fourth SRS is frequency division multiplexed (FDM) with SRS transmitted by one or more other UEs.

19. The method of claim 15, further comprising:

using a first spreading code to process the first SRS and the third SRS; and using a second spreading code to process the second SRS and the fourth SRS.

20. The method of claim 15, wherein the first comb size comprises an odd number.

21. The method of claim 20, further comprising transmitting signaling, to the UE, indicating the first comb size.

22. The method of claim 21, wherein the signaling indicates the UE is to use the first comb size when the first SRS and the second SRS are transmitted with a physical uplink shared channel (PUSCH) having a bandwidth less than a threshold value.

23. The method of claim 15, further comprising transmitting signaling indicating when the UE is allowed to perform at least one of time pre-compensation or frequency pre-compensation for SRS transmissions.

24. The method of claim 23, wherein the signaling indicates the UE is allowed to perform at least one of time pre-compensation or frequency pre-compensation at slot boundaries or subframe boundaries.

25. The method of claim 24, further comprising determining a duration between slot boundaries or subframe boundaries on which the UE is allowed to perform at least one of time pre-compensation or frequency pre-compensation, based on at least one of: satellite properties, parameters provided to derive a timing advance (TA), a cyclic prefix (CP) duration, or a subcarrier spacing.

26. A user equipment (UE) comprising at least one processor, coupled to at least one memory, and configured to cause the UE to:

transmit a first sounding reference signal (SRS), from a first antenna port in a first symbol, on one or more tones determined by a first comb size and a first tone offset;

transmit a second SRS, from a second antenna port in the first symbol, on one or more tones determined by the first comb size and a second tone offset different than the first tone offset;

transmit a third SRS, from the first antenna port in a second symbol, on one or more tones determined by the first comb size and the second tone offset; and transmit a fourth SRS, from the second antenna port in the second symbol, on one or more tones determined by the first comb size and the first tone offset.

27. An apparatus for wireless communications, the apparatus comprising at least one processor, coupled to at least one memory, and configured to cause the apparatus to:

receive, from a user equipment (UE), a first sounding reference signal (SRS), transmitted from a first antenna port in a first symbol, on one or more tones determined by a first comb size and a first tone offset;

receive, from the UE, a second SRS, transmitted from a second antenna port in the first symbol, on one or more tones determined by the first comb size and a second tone offset different than the first tone offset;

receive a third SRS, transmitted from the first antenna port in a second symbol, on one or more tones determined by the first comb size and the second tone offset; and receive a fourth SRS, transmitted from the second antenna port in the second symbol, on one or more tones determined by the first comb size and the first tone offset.

\* \* \* \* \*